United States Patent [19]

Peters

[11] Patent Number: 5,604,422
[45] Date of Patent: Feb. 18, 1997

[54] TRANSIENT VOLTAGE PROTECTION CIRCUIT FOR A DC VOLTAGE SUPPLY

[75] Inventor: Henricus P. M. Peters, Oss, Netherlands

[73] Assignee: U.S. Philips Corporation, New York, N.Y.

[21] Appl. No.: 554,120

[22] Filed: Nov. 6, 1995

[30] Foreign Application Priority Data

Nov. 10, 1994 [EP] European Pat. Off. .............. 94203278

[51] Int. Cl.$^6$ ....................................................... G05F 1/563
[52] U.S. Cl. ........................... 323/222; 323/224; 323/282; 361/18; 361/111
[58] Field of Search ............................... 323/222, 224, 323/223, 282, 351; 361/18, 111

[56] References Cited

U.S. PATENT DOCUMENTS

| | | | |
|---|---|---|---|
| 4,346,431 | 8/1982 | Steigerwald | 363/27 |
| 4,413,224 | 11/1983 | Krupka et al. | 323/222 |
| 4,434,396 | 2/1984 | Montague | 323/230 |
| 4,491,903 | 1/1985 | Montague | 363/48 |
| 4,539,617 | 9/1985 | Delaney et al. | 361/58 |
| 4,677,348 | 6/1987 | Schweickardt | 315/307 |
| 4,958,121 | 9/1990 | Cuomo et al. | 323/224 |
| 5,095,261 | 3/1992 | Schoofs | 323/222 |

FOREIGN PATENT DOCUMENTS 2100931  7/1971  Germany.

*Primary Examiner*—Peter S. Wong
*Assistant Examiner*—Adolf Berhane
*Attorney, Agent, or Firm*—Edward Blocker; Bernard Franzblau

[57] ABSTRACT

A transient voltage protection circuit for operating a lamp includes input terminals for connection to a supply voltage source which delivers a low-frequency AC voltage. A rectifier is coupled to the input terminals for rectifying the low-frequency AC voltage and has output terminals. A first branch comprising a series arrangement of a breakdown element and a first capacitor interconnects the output terminals and a second branch shunts the first capacitor for discharging the first capacitor. A further capacitor, across which a DC voltage is present during lamp operation, supplies an operating voltage to the lamp. A DC—DC converter is coupled to the output terminals and to the further capacitor and a third branch comprising a series arrangement of a diode and the further capacitor shunts the first capacitor. The DC voltage across the further capacitor does not rise or rises only slightly in the case of two voltage transients in quick succession or a transient having a comparatively high amplitude or a comparatively long duration.

15 Claims, 2 Drawing Sheets

TRANSIENT VOLTAGE PROTECTION CIRCUIT FOR A DC VOLTAGE SUPPLY

BACKGROUND OF THE INVENTION

This invention relates to a circuit arrangement for operating a lamp, provided with input terminals for connection to a supply voltage source which delivers a low-frequency AC voltage, rectifying means coupled to the input terminals for rectifying the low-frequency AC voltage and provided with output terminals, a first branch comprising a series arrangement of a breakdown element and first capacitive means and interconnecting the output terminals, and a second branch shunting the first capacitive means for discharging said first capacitive means.

Such a circuit arrangement is known from German patent document DE-OS 2100931. The second branch in the known circuit arrangement is formed by a resistor. If the low-frequency AC voltage is supplied by an AC mains which delivers the same low-frequency AC voltage to a (usually large) number of users, transients may arise due to various causes. Transients are here understood to be voltage peaks of comparatively high amplitude (often of the order of 1000 volts) which are superimposed on the low-frequency AC voltage during a comparatively short time. If the circuit arrangement is not provided with a transient suppressor, the occurrence of such transients may damage the components from which the circuit arrangement is built up. In the known circuit arrangement, the first branch and the second branch together form a transient suppressor. When a transient occurs, the breakdown voltage of the breakdown element is exceeded so that this element becomes conductive and charges the first capacitive means. Since the resistance of the breakdown element in the conductive state is comparatively low, the current with which the first capacitive means are charged is comparatively great, so that the transient is strongly suppressed. When the voltage across the first capacitive means has risen to a value equal to the instantaneous value of the voltage between the output terminals, the current through the breakdown element becomes zero and the breakdown element accordingly becomes non-conductive. The first capacitive means are now discharged through the resistor by which it is shunted. The resistor in the known circuit arrangement is a resistor with a positive temperature coefficient. It is achieved thereby that the resistor has a comparatively high value very quickly after breakdown of the breakdown element, so that the current flowing through the breakdown element is largely used for charging the first capacitive means. If the resistance value of the resistor were too low, the first capacitive means would not be charged sufficiently for rendering the breakdown element non-conductive. The comparatively high resistance value of the resistor at least immediately after the breakdown element has become non-conductive means that the discharge of the first capacitive means, after the suppression of a transient, takes comparatively long. If a next transient occurs before the first capacitive means have been fully discharged, the capacity of the transient suppressor for suppressing the transient may have been considerably reduced by a comparatively high instantaneous value of the voltage across the first capacitive means. Components of the circuit arrangement may thus be damaged when two transients occur immediately after one another. A similar problem arises when a transient of comparatively high energy content occurs. It is suggested in DE-OS 2100931 to counteract this disadvantage in that further transient suppressors of similar construction are included in the circuit arrangement parallel to the first transient suppressor, the breakdown voltage of the breakdown element of each further transient suppressor being chosen to be higher than that of the breakdown element in the preceding transient suppressor. Such a solution, however, requires comparatively many and comparatively expensive components so that the circuit arrangement is comparatively expensive.

SUMMARY OF THE INVENTION

The invention has for an object to provide a circuit arrangement in which an efficient safeguard against transients is realised by means of comparatively few and comparatively inexpensive components.

According to the invention, a circuit arrangement as described in the opening paragraph is for this purpose characterized in that the circuit arrangement is in addition provided with further capacitive means across which a DC voltage is present during lamp operation, with which voltage the lamp is supplied, a DC—DC converter coupled to the output terminals and the further capacitive means, and a third branch comprising a series arrangement of diode means and the further capacitive means which shunt the first capacitive means.

The further capacitive means in a circuit arrangement according to the invention act as a buffer capacitor. The DC voltage present across the further capacitive means during lamp operation is generated from the rectified low-frequency AC voltage by means of the DC—DC converter. Since the further capacitive means are connected to the first capacitive means via diode means, the current flowing through the breakdown element at the occurrence of a transient can also flow through the further capacitive means when the voltage across the first capacitive means has risen to a value equal to the DC voltage present across the further capacitive means during lamp operation augmented by the voltage drop across the diode means. It is achieved thereby that also the further capacitive means make a contribution, if necessary, to damping of the transient(s). This may be necessary when there are, for example, two transients in quick succession or a transient of comparatively great energy content. Since the further capacitive means perform not only the function of a transient suppressor but also that of a buffer capacitor in the circuit arrangement, the diode means are the only additional means necessary for realising a considerable improvement in the protection against transients in the circuit arrangement. It is possible to dimension the first capacitive means such that the DC voltage present across the further capacitive means does not rise or rises only slightly during the majority of the transients which occur because the transient is substantially completely or for the major part absorbed in the first capacitive means.

It should be noted that the document U.S. Pat. No. 5,095,261 shows a circuit arrangement for operating a lamp provided with a transient suppressor. The transient suppressor described in this Patent document comprises a resistor and capacitive means which together form a filter for transients. The operation is largely based on the creation of a comparatively high voltage drop across the resistor when a transient occurs. The capacitive means not only form a part of the transient suppressor, but also act as a buffer capacitor:

a DC voltage is present across these capacitive means during lamp operation, with which DC voltage the lamp is supplied. When a transient occurs, however, the voltage across these capacitive means rises very strongly. This is the case, more in particular, for example, with two transients in quick succession or with a transient of comparatively great energy content. This means that the portion of the circuit arrangement supplied with the DC voltage present across the capacitive means must be dimensioned for these voltage rises. In a circuit arrangement according to the invention, the DC voltage present across the further capacitive means as described above does not rise or rises to a much lesser extent only because the transient is either substantially absorbed by the first capacitive means or by the first and the further capacitive means jointly. It may be concluded for these reasons that the transient suppressor described in U.S. Pat. No. 5,095,261 has major disadvantages compared with the transient suppressor forming part of a circuit arrangement according to the invention.

It was found that a breakdown element of the Sidac type is very suitable for use in a circuit arrangement according to the invention. A Sidac-type breakdown element becomes conductive comparatively quickly, and a small voltage drop only is present across this breakdown element in the conductive state. This small voltage drop prevents a comparatively high voltage at the output of the DC—DC converter while a transient is being absorbed, partly also in dependence on the construction of the circuit arrangement.

In an advantageous embodiment of a circuit arrangement according to the invention, the second branch comprises an ohmic resistor. The second branch is realised thereby in a comparatively simple and inexpensive manner, while it is possible for the first capacitive means to discharge through the second branch after the breakdown element has become non-conductive, so that the transient suppressor again has a maximum capacity for suppressing further transients.

It is also advantageous for the first branch to include an inductive element. Many types of breakdown elements are not resistant to a current which rises too steeply. The inductive element insures that the current will not rise too steeply.

Good transient suppression results are obtained when the DC—DC converter is of the up-converter type.

It is possible to provide a circuit arrangement according to the invention with a fourth branch coupled to the DC—DC converter, which fourth branch comprises a series arrangement of an impedance and the further capacitive means, said impedance being shunted by a diode. It is achieved thereby that the circuit arrangement is protected against an excessively high inrush current.

BRIEF DESCRIPTION OF THE DRAWINGS

Embodiments of the invention will be explained with reference to a drawing, in which.

DESCRIPTION OF THE PREFERRED EMBODIMENTS

Figure 1:
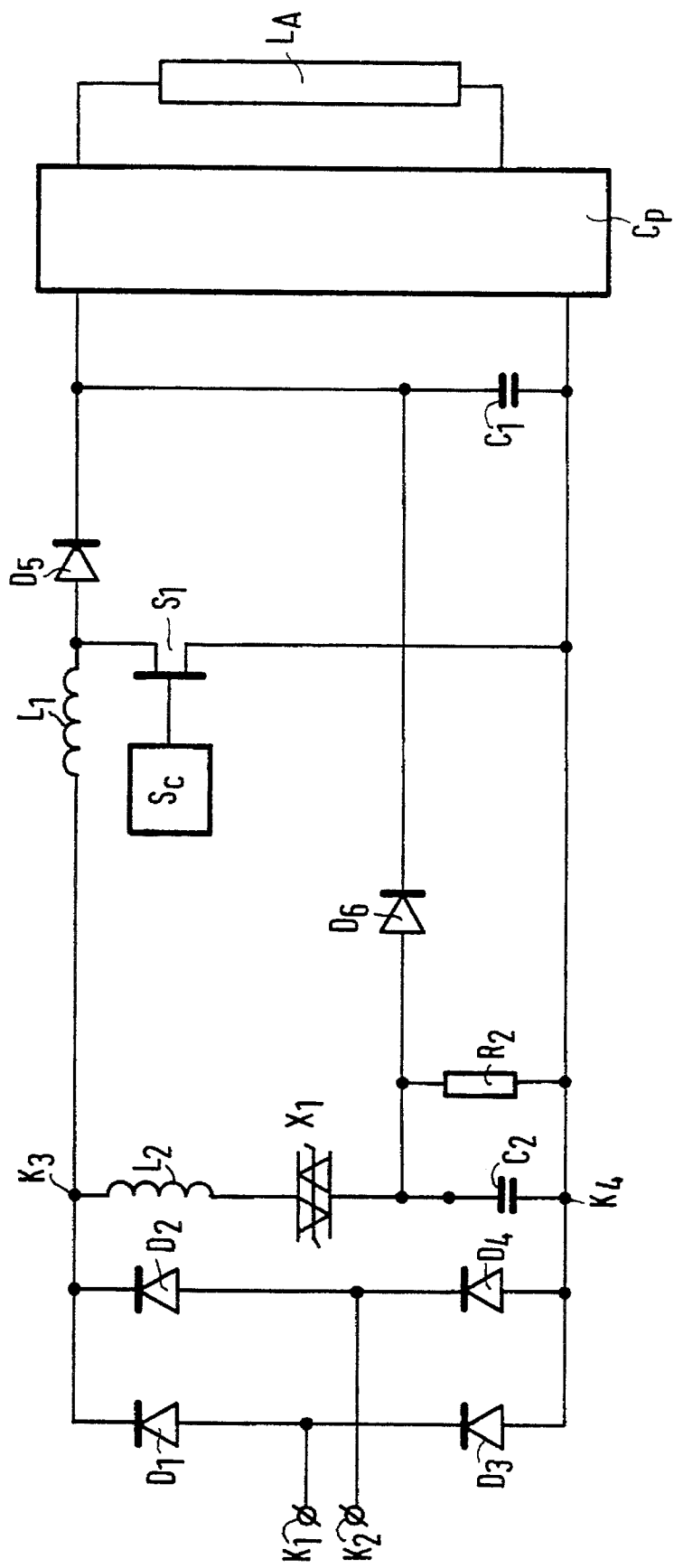
FIGS. 1 and 2 are diagrams of embodiments of a circuit arrangement according to the invention.

In FIG. 1, K1 and K2 form input terminals for connection to a supply voltage source which delivers a low-frequency AC voltage. Diodes D1–D4 form rectifying means which are coupled to the input terminals for rectifying the low-frequency AC voltage. Terminals K3 and K4 form output terminals of the rectifying means. Coil L2, Sidac X1 and capacitor C2 are an inductive element, a breakdown element, and first capacitive means, respectively, together forming a first branch which interconnects the output terminals. Ohmic resistor R2 in this embodiment forms a second branch which shunts the first capacitive means for discharging the first capacitive means. Coil L1, diode D5, switching element S1 and control circuit SC for generating a high-frequency control signal together form a DC—DC converter of the up-converter type. A series arrangement of coil L1 and switching element S1 connects output terminal K3 to output terminal K4. Control circuit SC is coupled to a control electrode of switching element S1. Capacitor C1 in this embodiment forms further capacitive means, and diode D6 and capacitor C1 together form a third branch which shunts the first capacitive means. Ends of the capacitor C1 are connected to a first and a second input, respectively, of a circuit portion CP for generating a current through a lamp La from a DC voltage present across the further capacitive means during lamp operation, ends of said lamp being coupled to respective outputs of the circuit portion CP. A junction point of coil L1 and switching element S1 is connected to the first input of circuit portion CP via diode D5.

The operation of the circuit arrangement shown in FIG. 1 is as follows.

When the terminals K1 and K2 are connected to a supply voltage source which delivers a low-frequency AC voltage, this AC voltage is rectified by the rectifying means formed by the diodes D1–D4 during stationary operation of the circuit arrangement. The rectified AC voltage is present between output terminals K3 and K4. The control circuit SC renders the switching element S1 conducting and non-conducting at a high frequency, so that the DC—DC converter generates a DC voltage, which is present across capacitor C1, from the rectified voltage present between output terminals K3 and K4. Circuit portion CP generates a current from this DC voltage, which current flows through the lamp La. If a transient arises during stationary operation of the circuit arrangement, the voltage between output terminals K3 and K4 accordingly rises to such an extent that the Sidac X1 becomes conducting. Owing to the comparatively high impedance of coil L1 to steeply rising currents, capacitor C1 is hardly charged by transients through coil L1 and diode D5. In the conductive state, the impedance of the Sidac is comparatively low, and a current of comparatively high amplitude flows through capacitor C2, whereby the transient is strongly suppressed. The voltage across capacitor C2 rises quickly. The Sidac becomes non-conducting when the voltage drop across capacitor C2 has become approximately equal to the instantaneous value of the voltage between output terminals K3 and K4. Depending on the dimensioning of capacitor C2, this capacitor C2 will not be charged by most transients up to a voltage which is higher than the DC voltage present across capacitor C1. This means that most transients will not cause diode D6 to become conducting, and thus cause no voltage increase across capacitor C1. With a transient of comparatively great amplitude or comparatively long duration, however, the voltage across capacitor C2 may rise to a value higher than the DC voltage across capacitor C1 augmented by the voltage drop across a conducting diode, so that diode D6 becomes conducting and the DC voltage across capacitor C1 rises. After the Sidac X1 has become non-conducting, the voltage across capacitor C2 decreases because C2 is discharged through resistor R2. It may happen with two transients in quick succession that capacitor C2 has not become fully discharged the moment Sidac X1 becomes conducting owing to a next transient. In this situation, too, the voltage across capacitor C2 may rise to a value for which diode D6 becomes conducting and the voltage across capacitor C1 rises. It is prevented that a comparatively high current will flow through components of the up-converter, or a comparatively high voltage will be present across these components whereby these components could become damaged in cases in which diode D6 becomes conducting. At the same time, the voltage rise across capacitor C1 is comparatively small in these cases because part of the transient is absorbed by capacitor C2. It is achieved thereby that the voltage across capacitor C1 does not rise, or rises only comparatively slightly as a result of a transient. This means that the components from which circuit portion CP is built up need be dimensioned for no more than a comparatively small rise in the voltage across capacitor C1.

Figure 2:
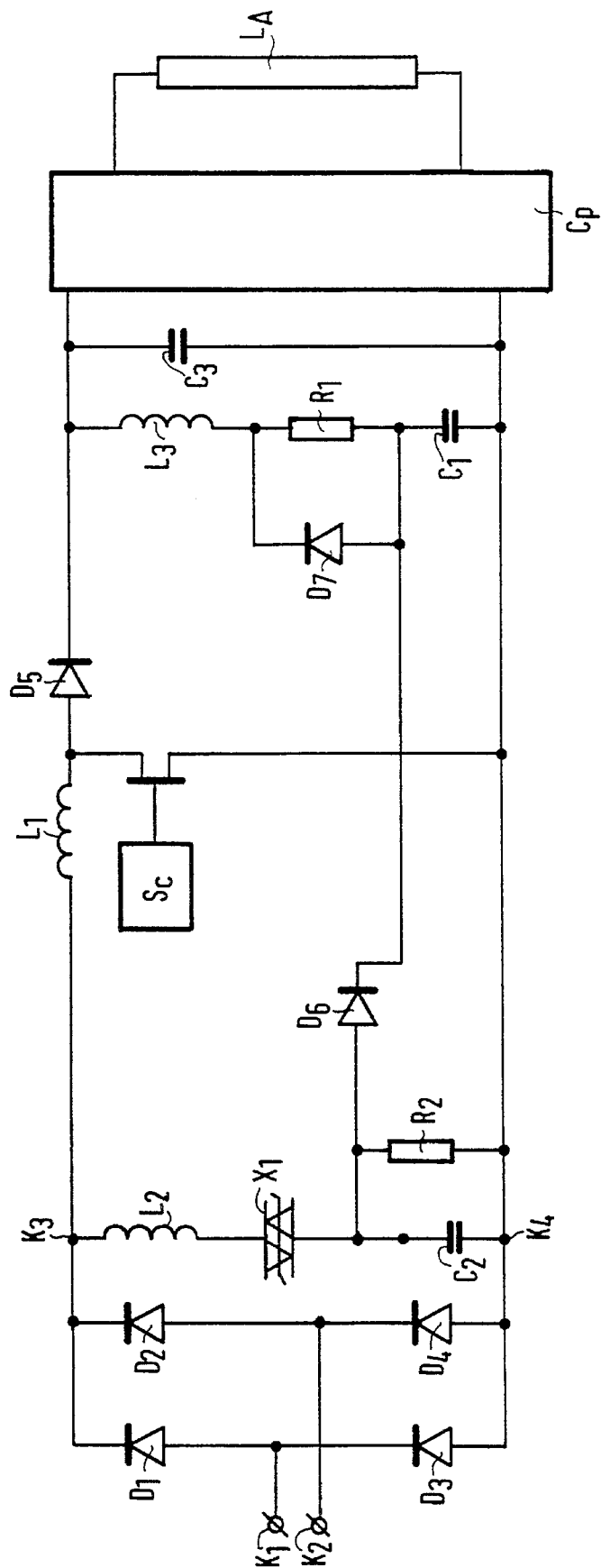

In FIG. 2, components and circuit portions corresponding to components or circuit portions of the embodiment shown in FIG. 1 have been given the same reference symbols. The first and second input terminals of circuit portion CP are interconnected by a series arrangement of coil L3, ohmic resistor R1, and capacitor C1. Ohmic resistor R1 is shunted by diode D7. The first and the second input terminal of circuit portion CP are similarly interconnected by a capacitor C3. Ohmic resistor R1 and diode D7 form means for preventing capacitor C1 from being charged by an excessively high inrush current immediately after starting of the switching arrangement. Coil L3 and capacitor C3 form a filter for suppressing a high-frequency voltage component in the voltage across capacitor C1. This high-frequency voltage component is caused inter alia by the up-converter. Both the means for limiting the inrush current and the filter are described in European Patent Application 94201859.9 not previously published.

The operation of the embodiment shown in FIG. 2 is analogous with the operation of the embodiment shown in FIG. 1. Besides coil L1, coil L3 and ohmic resistor R1 in this embodiment also form impedances which counteract charging of capacitor C1 through coil L1 when a comparatively high voltage caused by a transient is present between the output terminals K3 and K4. The fact that only a comparatively low voltage is present across the Sidac X1 while it is conducting prevents the voltage between the first and the second input of circuit portion CP from increasing considerably via coil L1 and diode D5 when a transient occurs which renders diode D6 conducting.

In a concrete embodiment of a circuit arrangement according to the invention as shown in FIG. 2, the inductance of coil L2 was 0.1 mH. The breakdown element was constructed as a series circuit of two breakdown elements of the Sidac type, each with a breakdown voltage of 240 V, type MKP3V240 from Motorola. The capacitance values of C1 and C2 were 22 µF and 10 µF, respectively. The power of the lamp supplied by the circuit arrangement was 100 W. The circuit arrangement was supplied with a sinusoidal AC voltage with an effective value of 220 V. A voltage of approximately 410 V was present between the first and the second input of circuit portion CP during stationary operation of the circuit arrangement. The voltage between the first and the second input of circuit portion CP does not increase to more than approximately 500 V when a voltage pulse with an amplitude of approximately 1000 V and a half-value width of approximately 50 µs supplied by a voltage source with an internal resistance of 2 Ω (in accordance with IEC 801-5) is superimposed on the supply voltage. It is thus achieved that a major portion of the circuit arrangement, in spite of the occurrence of transients, need only be dimensioned for a comparatively small voltage increase during the occurrence of these transients.

I claim:

1. A circuit arrangement for operating a lamp comprising:

input terminals for connection to a supply voltage source which delivers a low-frequency AC voltage, rectifying means coupled to the input terminals for rectifying the low-frequency AC voltage and provided with output terminals, a first branch comprising a series arrangement of a breakdown element and first capacitive means interconnecting the output terminals, a second branch shunting the first capacitive means for discharging said first capacitive means, further capacitive means coupled to the lamp and across which a DC voltage for supplying the lamp is present during lamp operation, a DC—DC converter coupled to the output terminals and the further capacitive means, and a third branch comprising a series arrangement of diode means and the further capacitive means and shunting the first capacitive means.

2. A circuit arrangement as claimed in claim 1, wherein the breakdown element is of the Sidac type.

3. A circuit arrangement as claimed in claim 1, wherein the second branch comprises an ohmic resistance.

4. A circuit arrangement as claimed in claim 1, wherein the first branch further comprises an inductive element.

5. A circuit arrangement as claimed in claim 1, wherein the DC—DC converter comprises an up-converter.

6. A circuit arrangement as claimed in claim 1, further comprising a fourth branch coupled to the DC—DC converter, which fourth branch comprises a series arrangement of an impedance and the further capacitive means, said impedance being shunted by a diode.

7. A power supply circuit for operating a discharge lamp comprising:

first and second input terminals for connection to a low frequency AC supply voltage source, a rectifier circuit coupled to the first and second input terminals for deriving a DC supply voltage at its output, first and second output terminals for coupling to a discharge lamp, a first branch circuit comprising a series circuit of a voltage breakdown element and a first capacitor coupled to the output of the rectifier circuit, a second branch circuit in shunt with the first capacitor and including means for discharging the first capacitor, a DC/DC converter coupled to the output of the rectifier circuit and to at least one of said first and second output terminals, a further capacitor coupled to the DC/DC converter and to the first and second output terminals for supplying a DC operating voltage to the output terminals during operation of the power supply circuit, and a third branch circuit comprising a series circuit of a diode and the further capacitor and connected in shunt with the first capacitor, whereby the first and third branch circuits provide protection against a transient voltage appearing at the output of the rectifier circuit.

8. The power supply circuit as claimed in claim 7 wherein said voltage breakdown element has a breakdown voltage that is higher than the AC supply voltage.

9. The power supply circuit as claimed in claim 7 wherein said DC/DC converter comprises;

an inductor and a second diode connected in series circuit between the output of the rectifier circuit and the at least one output terminal, and a switching transistor coupled to a junction point between the inductor and the second diode and to a circuit point coupled to the other output terminal.

10. The power supply circuit as claimed in claim 7 wherein said further capacitor functions as a buffer capacitor for a discharge lamp and also as an auxiliary transient voltage protection device which is isolated from the transient voltage so long as the voltage across the further capacitor is greater than the voltage across the first capacitor.

11. The power supply circuit as claimed in claim 7 wherein the voltage breakdown element comprises a bidirectional current conduction device.

12. The power supply circuit as claimed in claim 11 wherein the voltage breakdown element comprises a Sidac element having a breakdown voltage substantially higher than the forward voltage of a conventional diode.

13. The power supply circuit as claimed in claim 7 wherein the series circuit of the first branch circuit further comprises an inductor.

14. The circuit arrangement as claimed in claim 6 wherein said diode in the fourth branch is connected with opposite polarity to a DC voltage developed at an output of the DC/DC converter.

15. The power supply circuit as claimed in claim 7 wherein the first branch circuit is coupled to the input side of the DC/DC converter and said further capacitor is coupled to the output side of the DC/DC converter.

* * * * *